A. FAY.
APPARATUS FOR OPERATING UPON COMPOSITE SUBSTANCES.
APPLICATION FILED MAR. 1, 1915.
1,210,780.
Patented Jan. 2, 1917.
6 SHEETS—SHEET 1.
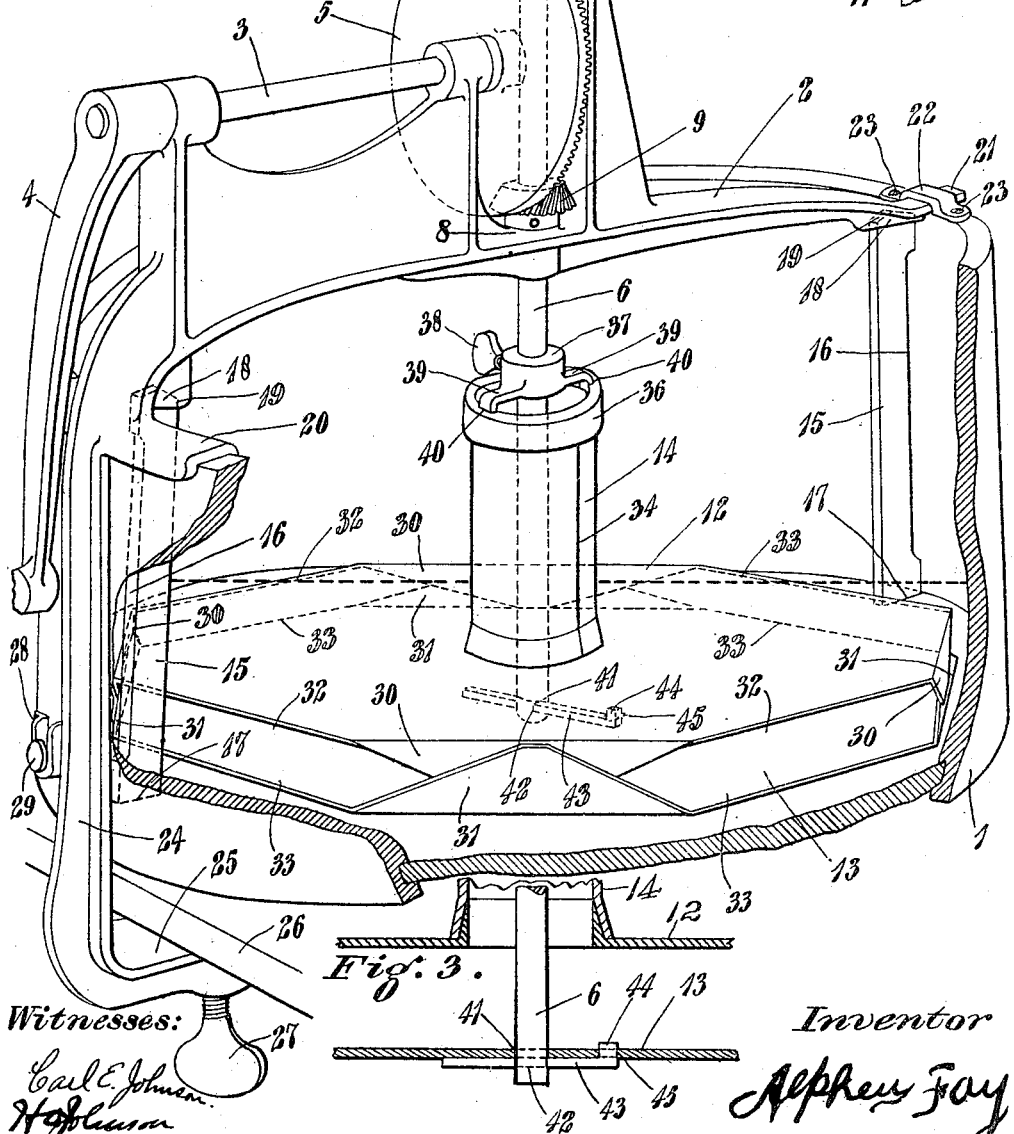
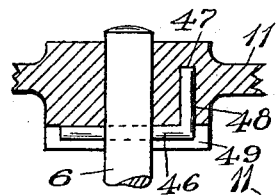
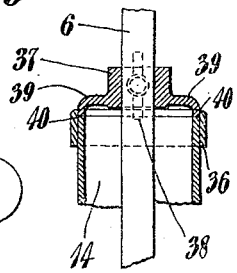
Witnesses:
Carl E. Johnson
H. Johnson
Inventor
Alpheus Fay A. FAY.
APPARATUS FOR OPERATING UPON COMPOSITE SUBSTANCES.
APPLICATION FILED MAR. 1, 1915.

1,210,780.

Patented Jan. 2, 1917.
6 SHEETS—SHEET 2.

WITNESSES:

INVENTOR.

A. FAY.
APPARATUS FOR OPERATING UPON COMPOSITE SUBSTANCES.
APPLICATION FILED MAR. 1, 1915.

WITNESSES:

INVENTOR.

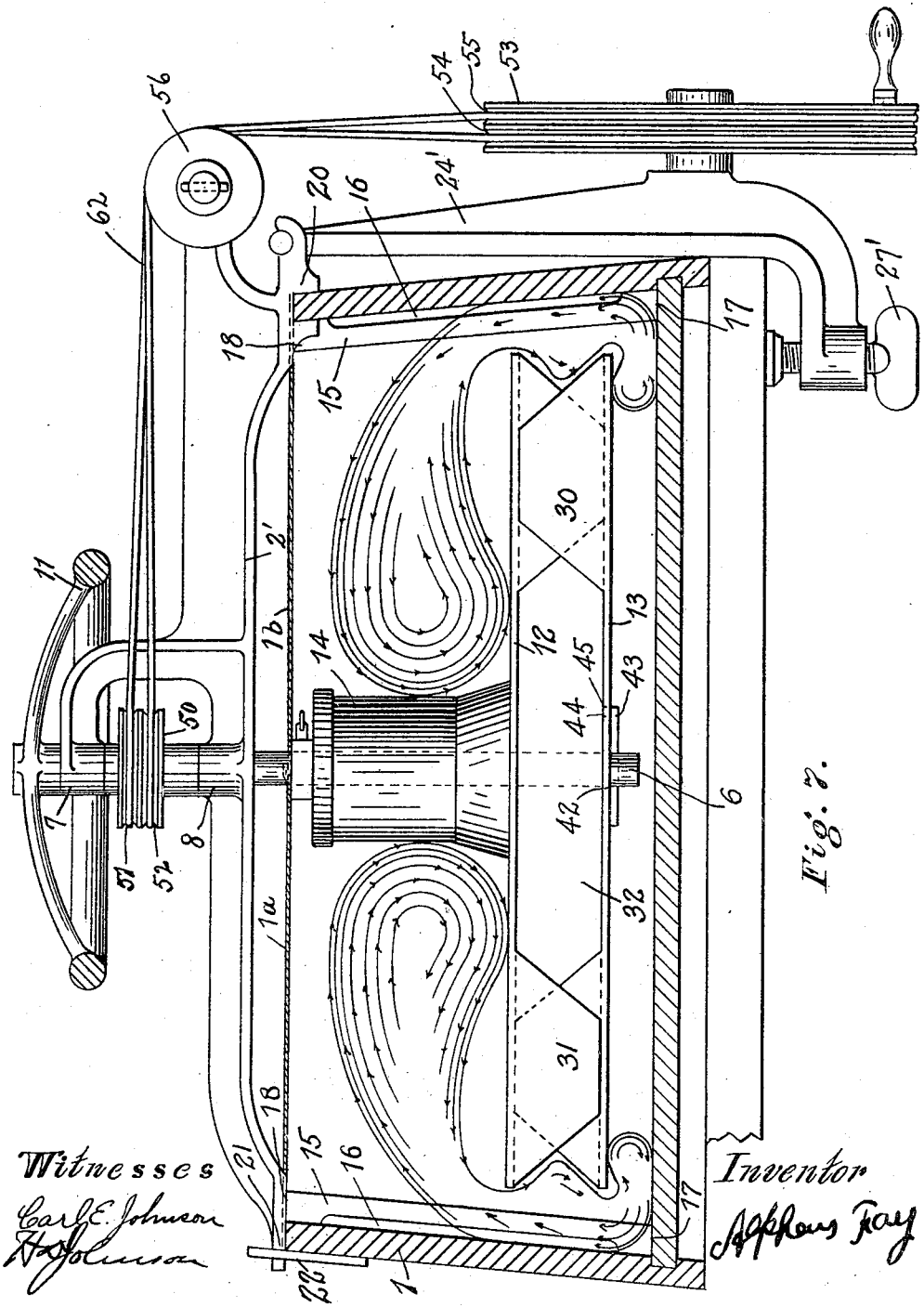

A. FAY.
APPARATUS FOR OPERATING UPON COMPOSITE SUBSTANCES.
APPLICATION FILED MAR. 1, 1915.
1,210,780.
Patented Jan. 2, 1917.
6 SHEETS—SHEET 5.
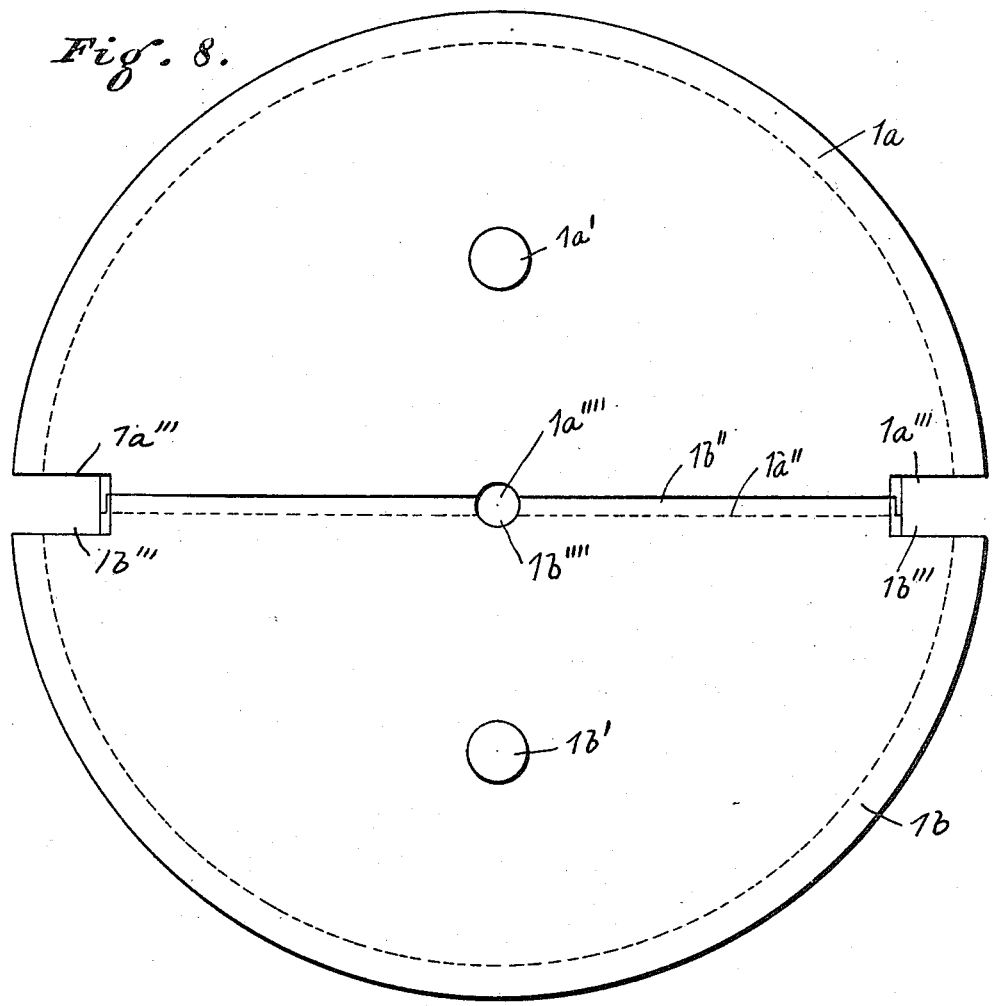
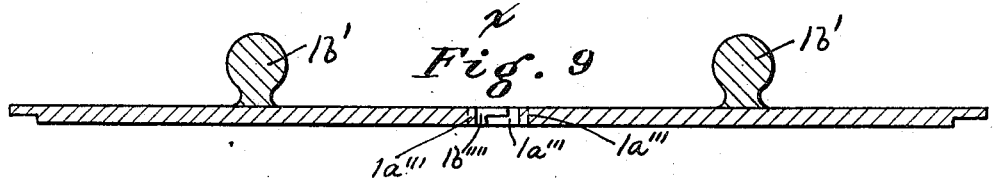
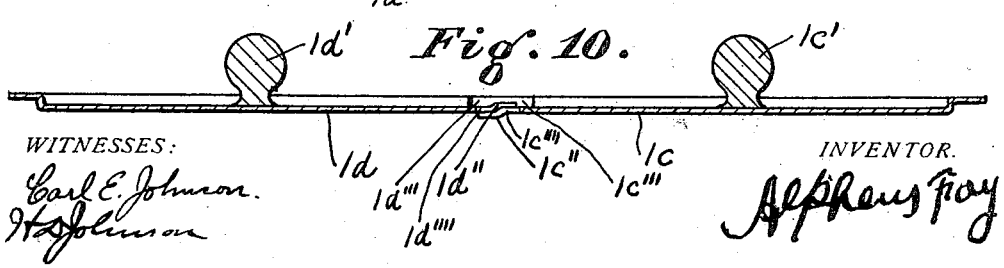

A. FAY.
APPARATUS FOR OPERATING UPON COMPOSITE SUBSTANCES.
APPLICATION FILED MAR. 1, 1915.
1,210,780.
Patented Jan. 2, 1917.
6 SHEETS—SHEET 6.
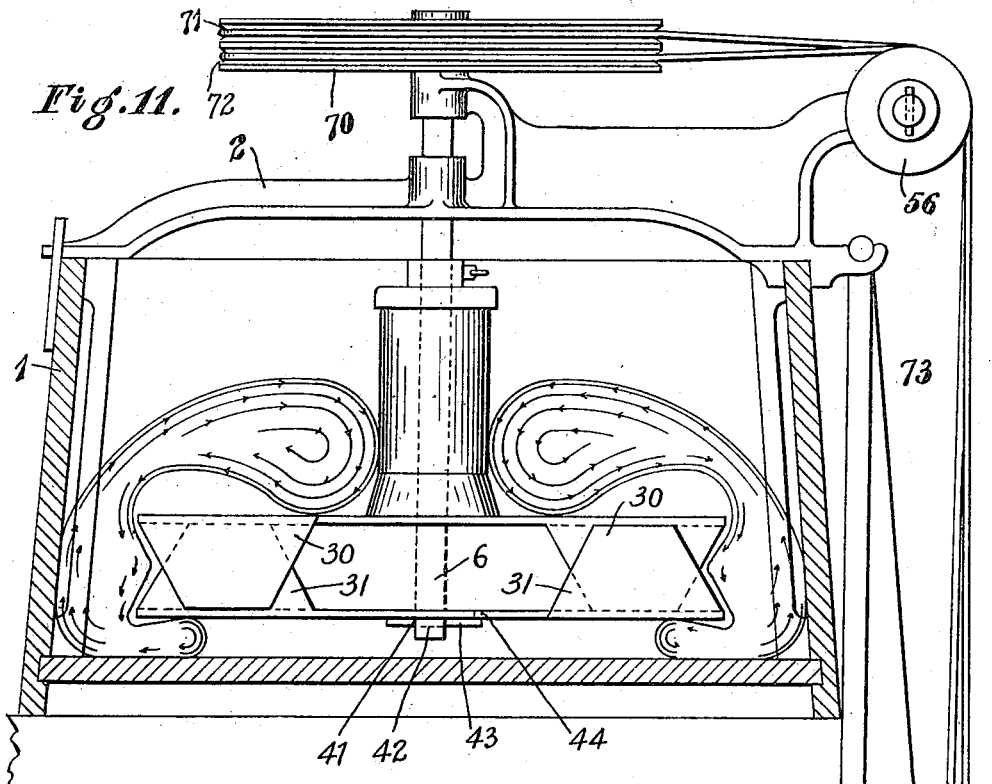
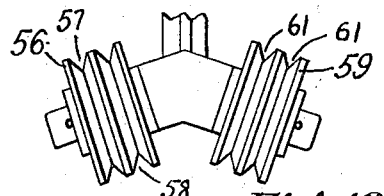
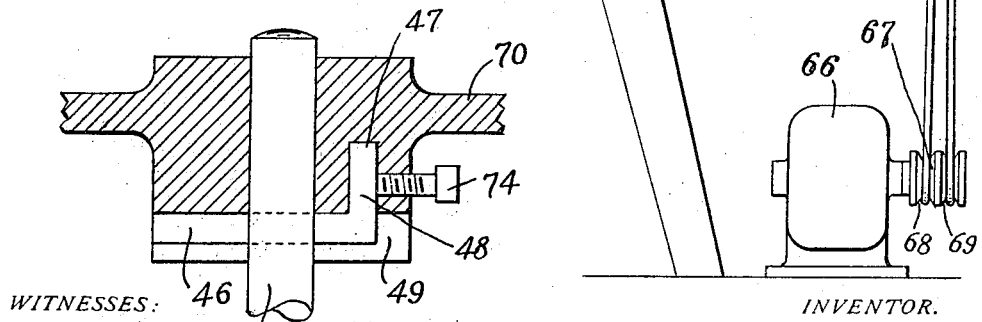
WITNESSES:
INVENTOR.

UNITED STATES PATENT OFFICE.

ALPHEUS FAY, OF LOUISVILLE, KENTUCKY.

APPARATUS FOR OPERATING UPON COMPOSITE SUBSTANCES.

1,210,780.      Specification of Letters Patent.    Patented Jan. 2, 1917.

Application filed March 1, 1915. Serial No. 11,353.

*To all whom it may concern:*

Be it known that I, ALPHEUS FAY, a citizen of the United States, and a resident of Louisville, in the county of Jefferson and State of Kentucky, have invented a certain new and useful Apparatus for Operating Upon Composite Substances, of which the following is a specification.

My invention relates to a novel apparatus operating centrifugally upon a substance, and the object is to provide means for operating upon substances such as milk elements in such a manner that the proportion of vertical pressure and of the impact within the body of liquid and the consequent disruptive agitation are minimized and the proportion of aeration, centrifugal and centripetal action therein are maximized by virtue of operating in a body of substance with its depth minimized and its diameter maximized, equally distributing all of the forces to operate uniformly throughout the body of substance at a greater altitude of development.

Another object is to provide a device of this character of simplified and inexpensive construction, so arranged that the milk elements will be treated with facility, reducing the time and labor of operation as well as making it more convenient to place the apparatus in condition for operation and to take it apart after the operation is complete and keep it clean and sanitary.

My invention consists in the apparatus and the combination of parts thereof and in the details of construction and arrangement of such parts as will hereinafter be more fully described and claimed.

Figure 5:
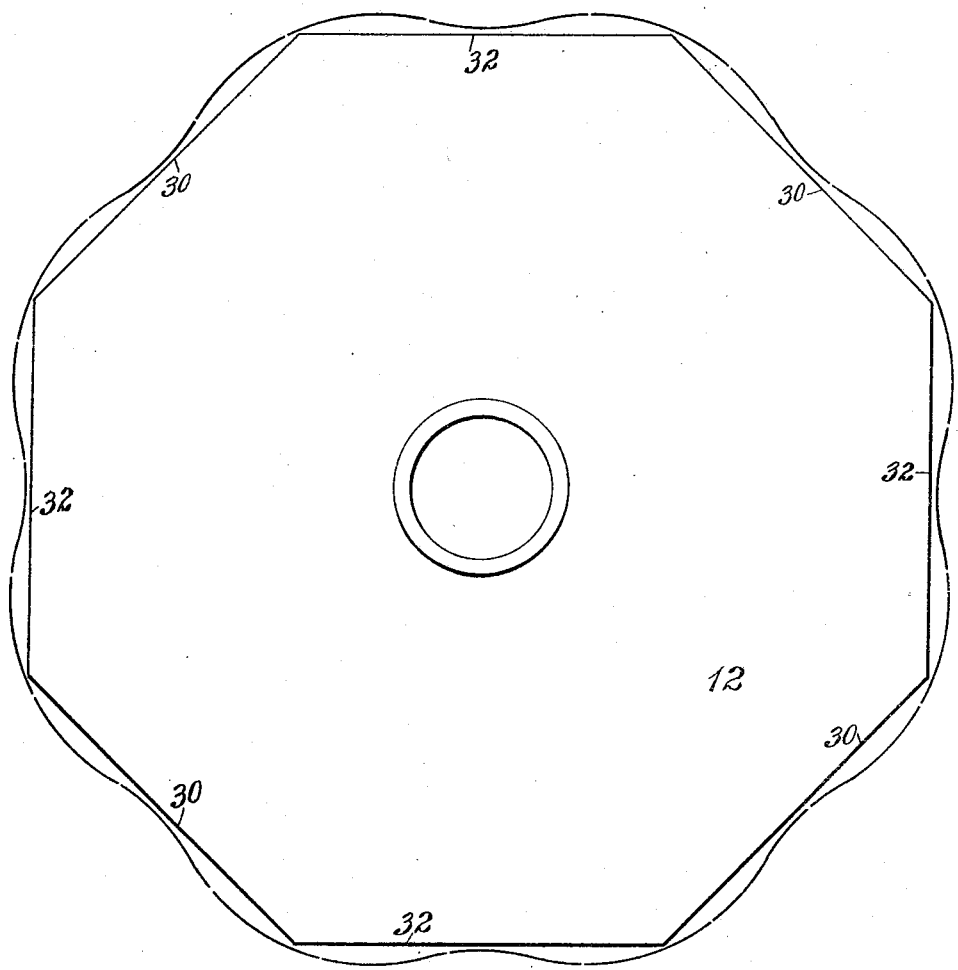
Figure 6:
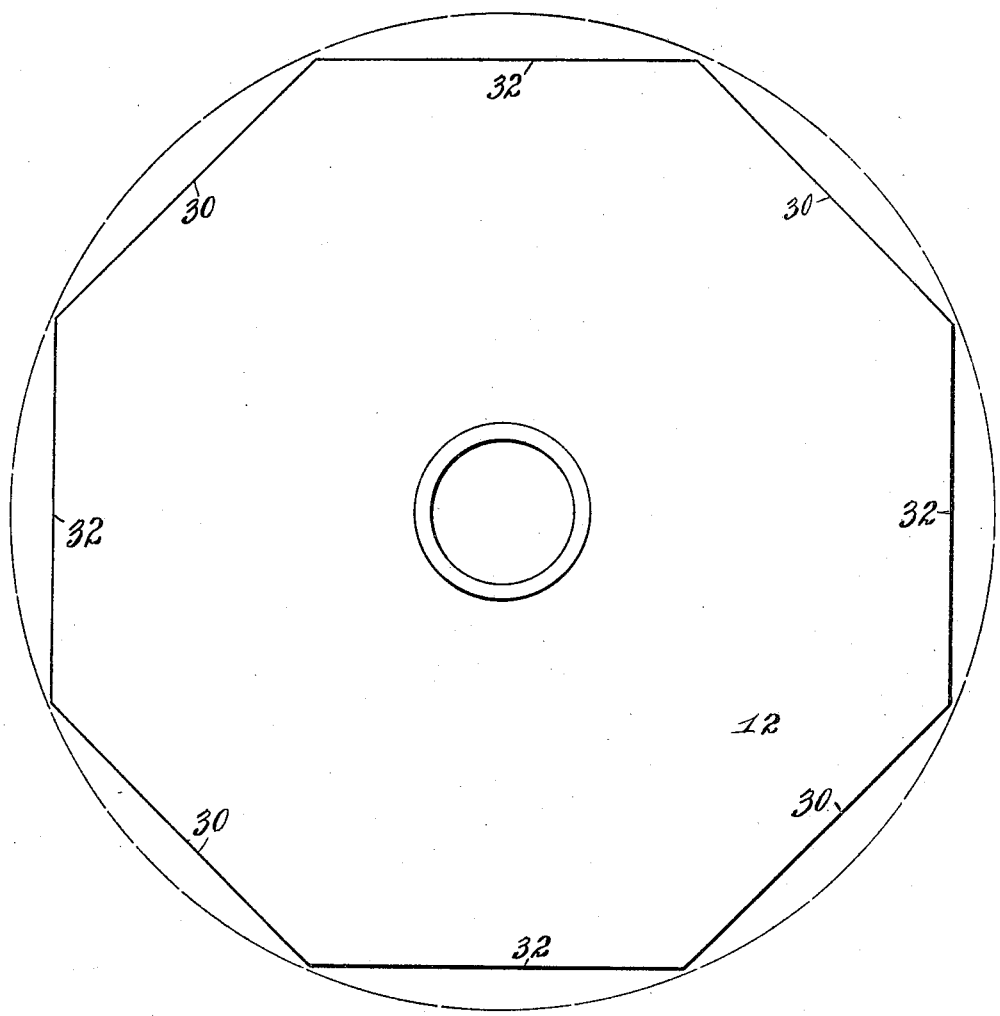

In the drawings: Figure 1 is a sectional perspective view of an apparatus embodying my invention; Fig. 2 is a detail sectional view of the upper end of the hollow shaft and its means for securing it to the solid shaft. Fig. 3 is a detail sectional view of the lower end of the solid and hollow shafts and the means for holding the lower and upper impeller members thereon. Fig. 4 is a detail sectional view showing how the fly wheel is attached to the top of the solid shaft. Fig. 5 shows the action of the impeller on the substance when it first starts to act. Fig. 6 shows the action of the impeller on the substance when at maximum speed. Fig. 7 is a sectional view through the composite material when the impeller is at maximum speed, and also showing how the impeller is driven by a double endless belt. Fig. 8 is a plan view of the lid shown in Fig. 7. Fig. 9 is a section of the lid on the line X of Fig. 8. Fig. 10 is a similar section showing a modification of the lid. Fig. 11 is a sectional view of apparatus driven by a motor with a double endless belt. Fig. 12 is a side elevation of the idler pulleys therefor, and Fig. 13 is an enlarged detail of a sectional view showing a modification of the fly wheel mounting.

The vessel for containing milk elements to be operated upon is of wide and low formation, providing an ample base, so that the vessel is readily secured in a substantial manner to a table or other supporting means. This vessel as shown in Fig. 7 may be provided with a lid composed of two sections, $1^a$ and $1^b$, which overlap at the middle with rabbeted or flanged edges $1^{a''}$ and $1^{b''}$, and at the ends of this joint have notches $1^{a'''}$ and $1^{b'''}$, so that when the sections come together openings will be left to admit the bracket 2 to the upper rim of the vessel. These lid sections preferably have knobs $1^{a'}$ for lifting them off of the vessel and coinciding notches $1^{a''''}$ and $1^{b''''}$ at the center to fit around the operating shaft of the device. These lid sections may be made of wood, and will then be as shown in Figs. 8 and 9; but may be made of metal, such as the sections $1^c$ and $1^d$ of Fig. 10, which have knobs $1^{c'}$ and $1^{d'}$, respectively, and flanges $1^{c''}$ and $1^{d''}$, respectively, and notches $1^{c'''}$ and $1^{d'''}$ respectively and $1^{c''''}$ and $1^{d''''}$, respectively. The outer edges of these lids may be recessed to fit down on the rim of the vessel as shown.

The wide and low formation of the vessel, in addition to providing a firm foundation therefor, prevents the substance operated thereon from becoming deep in proportion to its diameter.

Keeping the depth of the substance shallow in proportion to its diameter is a very important feature in the satisfactory operation of my apparatus, and for that reason I make my vessel for containing the substance to be operated upon of a wide and low formation, namely, the diameter being greater than its depth. This is according to the method set forth and claimed in my copending applications, Serial No. 744,158, filed January 25, 1913, Serial No. 829,982, filed April 6, 1914, and Serial No. 11,355, filed March 1, 1915.

The bracket 2 is mounted across the top of the vessel and secured to the rim thereof, as will be more particularly described hereinafter.

A shaft 3 is journaled horizontally in the bracket and has a crank 4 fixed on it outside the bracket. A bevel gear 5 is fixed on this shaft inside the bracket and a vertical shaft 6 is journaled in the bracket 2 in upper and lower bearings 7 and 8 with a bevel pinion 9 fixed on it and in mesh with the bevel gear 5. On the upper side of the upper bearing 7 of the shaft 6 is a fly wheel 11 fixed on said shaft 6.

The shaft 6 extends down into the vessel 1 and carries an impeller in the form of plane polygonal members 12 and 13 above and below, respectively, the upper one 12 having a hollow shaft 14 surrounding the shaft 6. These agitator members and the means for securing them to the shaft 6 will be more fully described hereinafter. To properly coöperate with this agitator, brakes 15 are mounted in upright position against the opposite walls of the vessel 1 and these brakes 15 are preferably of wood, and preferably have their sides 16 next to the walls of the vessel separated from the wall a short distance by cutting away the material of the brake from near the upper end to near the lower end of the brake, the material left near the ends bearing directly against the vessel walls. The space thus left allows circulation of the liquid between the brake and the wall. The lower end 17 of the brake is cut substantially square and is designed to bear tightly on the bottom of the vessel, but the upper end 18 is preferably inclined both ways from the middle, and these upper ends fit inside sockets 19 formed in the lower sides of the bracket 2 near where the bracket bears on the rim of the vessel at each end. This formation of the upper ends 18 of the brakes 16 as above described, permits these sockets 19 to be conveniently formed in the bracket which is preferably of cast metal, such socket being comparatively shallow and of formation corresponding to the formation of the end 18, so that no corners are left therein which are liable to be imperfectly formed during the casting, or from which it would be difficult to clean the material of the mold in which the bracket is cast. With the upper end of the brake thus fitting snugly in the shallow socket, and with the brake of such length that the bracket thus holds the lower end 17 to the vessel, the brake will be sufficiently held against the impact of the liquid being operated upon, but will be very conveniently removed from the bracket when the apparatus is to be taken apart after the operation is completed, permitting the brake as well as the bracket to be thoroughly cleaned.

The bracket 2 has, at the end where the crank 4 is, a transverse part 20 with its lower side of channeled formation to fit snugly on the rim of the vessel and support the bracket at that end, while the other end 21 of the bracket is simply in the form of a flat shank which slips under a cleat 22 secured to the upper side of the rim of the vessel, preferably by screws 23 as shown. Joining the bracket 2 outside the channeled part 20 and preferably integral with the bracket is an arm 24 that extends down along the outside of the vessel when the bracket is placed on the vessel, this arm 24 having a terminal part 25 adapted to come sufficiently far below the bottom of the vessel to pass under the table or other object 26 upon which the vessel is to be supported, and this terminal part 25 has a clamp screw 27 passing up through it to bear against the lower side of the top of the table or other object 26. With the shank end 21 of the bracket fitting snugly under the cleat 22 and thus supporting and steadying this end of the bracket, and with the channeled part 20 fitting the rim of the vessel 1 snugly, it is thus possible to secure the bracket 2 firmly on the vessel 1, and at the same time secure the vessel firmly on the table or other object. This result is thus attained by means of the very simple construction of the combined bracket and clamp; and the work of securing it is reduced to merely slipping the shank end 21 under the cleat 22, bringing the part 20 down on the rim of the vessel and then sliding the vessel over on the table or other object until the terminal part 25 comes under the top of the table or other object, and then screwing the clamping screw tightly in position.

The fact of my vessel being low in proportion to its depth makes it possible to make the arm 24 short, causing it to be very rigid and facilitating the casting of the bracket 2 and arm 24 in one piece; but a modified form is shown in Figs. 7 and 12, where the brackets 1 and 2″ and arms 1 and 24″ are made in two pieces, making possible for the bracket, brakes and vessel to be tightened to the table in one operation.

Immediately above the bottom of the vessel the vessel wall may have an opening provided with a lip 28 on the outside, through which opening liquid may be withdrawn from the vessel. A suitable stopper 29 forms a suitable means for closing this opening.

Each of the agitator members 12 and 13 is composed of a square sheet of metal with its corners bent down or up, as the case may be, so that the complete member is octagonal with triangular sides 30 and 31, respectively. These members thus formed are inversely assembled and preferably, as shown, each member has two opposite diagonal sides outside the engaging diagonal side of the other member. This involves the forming of the two opposite sides on each member different distances apart, but it permits the two members to be formed alike and simply rotated with respect to each other a quarter-revolution to have them come together as above noted. If all the sides of one member were made to engage outside all of the sides of the other member the two members could not be formed alike as regards these diagonal sides. In addition, the assembled agitator is made more symmetrical and is adapted to operate better upon the liquid, due to its symmetrical formation.

The hollow shaft 14 is preferably made of a single rectangular plate, bent into cylindrical form, with its ends 34 abutting. The lower end of this hollow shaft, thus formed is flared out and fits snugly over a tapered flange which extends upward from the upper agitator member 12. Thus, the open lower end of the shaft 14 communicates directly with the space between the two members 12 and 13.

The hollow shaft 14 can be readily removed. The object of having the hollow shaft 14 removable is to make it easier to clean, thereby making it more sanitary, and also the "knock-down" feature is a benefit when shipping, enabling the making of a smaller package.

The upper end of the hollow shaft 14 has a ferrule 36 fitting around it snugly, with the upper edges of the ferrule turned in over the upper edges of the tubular shaft, said ferrule being suitably rigidly secured to the tubular shaft. A hub 37 fits on the solid shaft 6 above the upper end of the tubular shaft 14 and has a set screw 38 clamping it to the shaft 6. This hub 37 has radial arms 39 which have terminal portions bent down and entering recesses 40 in the inner sides of the inturned part of the ferrule 36 and resting on the upper edges of the tubular shaft 14 where they are held by these recesses. The lower impeller member 13 simply has the opening 41 through it down through which extends the shaft 6 through which a pin 43 passes below the lower side of the lower impeller member. One end of this pin 43 has an upwardly extending lug 44 which engages in an opening 45 in the lower impeller member when the pin is passed through the shaft 6. Thus when the lower impeller member bears down on the pin 43 with the lug 44 extending up through the opening 45 in the impeller member the pin 43 not only holds the impeller member on the shaft 6 but the impeller member holds the pin in its position for this purpose.

The upper impeller member, along with the tubular shaft 14, may be adjusted up or down along the shaft 6 and by the engagement of the triangular parts into this upper structure held down by the hub 37 with its arms 39 bearing as before described, will hold the lower impeller member down against the pin 43. The hollow shaft 14 is made high enough to come above the upper surface of the liquid.

Fig. 1 represents the impeller members at the right height in the vessel, and the heavy dotted lines indicate the right height of the liquid to be operated upon.

The use of the plane agitator members 12 and 13, depending for centrifugal and centripetal actions on the surrounding liquid, entirely upon the frictional contact of said liquid with the plane surface of the members and upon the slight angular engagement of the diagonal sides 30 and 31 with the adjacent liquid, marks a distinct departure in the art of constructing and operating centrifugally and centripetally upon fluids. Thus arranged, when the agitator is rotated, the liquid in contact therewith is thrown horizontally along the plane upper and lower surfaces of the members outward in every direction and is also thrown away from the diagonal sides of the members as shown in Figs. 5, 6 and 7. The wall of the liquid around the periphery of the impelling member is of a V-shape serpentine formation. The centrifugal and centripetal actions along the plane surfaces of the members will cause a reduction of pressure of the liquid in the central regions around the shaft 6 inside the hollow shaft 14, and also around the outside of the hollow shaft 14 with the result that atmospheric air under atmospheric pressure will pass downwardly into the liquid in such central regions until it reaches the upper surfaces of the members, where it will be carried outward along with the liquid that is being thrown outward by this centrifugal action. The frictional centrifugal action of the lower surface of the lower member serves to keep the region between this member and the bottom of the vessel clear of the solid matter that collects as a result of the operation, as for instance, the collection of the butter particles in separating butter from the other milk elements. The liquid thrown out by the lower surfaces of the members mingles in the regions around the peripheries of the members with the liquid thrown out by the upper surfaces of the members, and with the air carried along by said liquid. The tendency of these currents of liquid and air is upward adjacent to the walls of the vessel, and the brakes 15 will prevent simple whirling of the liquid in the vessel and so modify the direction of the liquid and air currents that a continuous smooth and steady roll of the rarefied liquid will occur all around the vessel, as shown in Fig. 7. Owing to the absence of impact by the impeller, the nature of the liquid and air currents will be such that their contact with the brakes will not result in any violent agitation. On the contrary, the application of the forces to the liquid and air is so steady and smooth that an extremely uniform distribution of the forces and air throughout the body of liquid is effected. This uniform action throughout the liquid is comparable to the uniform activity of a body of liquid undergoing a gentle boiling process caused by heat applied to the liquid. I have discovered that such a uniform distribution of the forces throughout a liquid produces true ebullition, without heat.

The result of operation according to my method is to produce the above described true ebullition; and as near as I have been able to determine, this true ebullition is the manifestation of a huge number of vibrations, the result of a huge number of distinct and minute currents of infinitesimal elements of energy very uniformly distributed throughout the body of milk or other liquid. These vibrations separate the butter or fatty elements causing the non-fatty elements to divide and go into minute suspension or solution with the water of the milk or other liquid; or else to remain in such minute suspension or solution in the water as they were in the original milk or other liquid; and causing the fatty elements to form into visible or palpable bodies in the form of crystals or granules of about the size and shape of coarse grains of salt. On account of the exceedingly minute divisions of the distribution of the forces throughout the liquid body, and the uniformity of this distribution, these changes are harmoniously brought about in an exceedingly short space of time, as herein described. The wide difference between the nature of this operation and that of ordinary churning or separating operation, either without aeration or with inferior and practically negligible aeration, is indicated by the great difference in time required to bring about these changes as regards my invention compared to other methods herein alluded to, as well as by the marked increase in purity of the product and the increase in proportion to fatty elements recovered, as will be more fully pointed out herein. Processes of separating butter from the other milk elements have always involved some kind of violent agitation; and, where aeration was resorted to, the means and methods employed were such that the aeration obtained was practically negligible owing to lack of uniform application. I minimize the agitation and the vertical pressure and maximize the aeration and centrifugal force so that the proper proportion of vertical pressure, aeration, agitation, centrifugal and centripetal force is obtained, with the result that true ebullition is obtained without the application of heat.

Forcing air through a liquid by the action of a pump or blower has more the effect of mechanical agitation than it does of aeration, and cannot be described as true ebullition for this reason, and also for the reason that the distribution of all the forces throughout the liquid will not be uniform. With my method, involving centrifugal and centripetal action without impact, the entrance of the air into the liquid is caused merely by the atmospheric pressure, and the action is such that the air entering under this pressure is brought into contact with practically every particle of the liquid during the operation. This, in conjunction with all the other forces acting uniformly on the liquid, produces true ebullition.

With the same volume of liquid placed in a deep vessel or a shallow vessel, and the diameter of the shallow vessel being such that the liquid will be about half the depth of that in the deep vessel the energy required to churn the cream is about one-fourth that in the shallow vessel to what would be required to do the same work in the deep vessel, and the result attained will be better, namely, better butter and more butter, than can be made in the deep body of liquid. The butter which is made by revolving a disk in a shallow body of cream will not become rancid as soon as butter made in the ordinary way, because the small globules of butter fat have not been broken up and the other ingredients of the milk which cause butter to become rancid have been kept separated from the butter-fat globules.

The friction of disks revolving in a liquid is directly proportional to the area of rubbing surface; the energy required is proportional to the resistance overcome. According to my method the liquid depth must be such that the force applied will be uniformly distributed throughout the entire body of liquid. When a disk revolves in a liquid that has its depth several times greater than its diameter the liquid immediately in contact with the disk, and for a very limited distance from the disk, may be affected; but the main body of the liquid will not be acted upon. In a shallow body of liquid, which has a diameter great in proportion to its depth, the vertical pressure on the disk is slight, and all the liquid in turn being in true contact with the disk, the forces applied are utilized in the most efficient manner possible.

The peripheral speed of my disks is always the same, approximating about eleven hundred and fifty feet per minute. I have found by revolving disks in cream of different depths that the same disk revolving in shallow cream will produce more butter, better butter, and make it in less time.

In the shallow body of liquid, the energy applied through the disk to the liquid is equally distributed through the entire body; but in the deep body of liquid the forces are not equally distributed. Therefore the efficiency is less in the deep body of liquid; and owing to the relation between the disk and the deep body of liquid it is impossible to ever attain the same efficiency in a deep body of liquid as in a shallow body by my process, and if the body of liquid is very deep in proportion to the diameter no perceptible effect would be had upon it.

In two vessels containing the same quantity of liquid, one having its height twice that of the other, and the shallow one having its diameter increased so that half the height will cause it to contain the same amount of liquid as the tall vessel, and my disk is revolved in the shallow body of liquid, the energy required to operate the disk of greater diameter will be about one-fourth that required to operate the disk of lesser diameter; the peripheral speed of the disks being the same. To operate my device at the greatest efficiency, the depth of the liquid must have the right relation to the diameter. For example, a vessel of 7" diameter and 12" high, inside measurement, would contain about 2 gal., and a vessel $9\frac{5}{8}$" diameter and 6" high, inside measurement, will contain about two gallons. Now, if I place one of my disks 6" in diameter in the vessel which is 12" high and submerge it in a liquid within the vessel 6" from the top and place one of my disks $8\frac{5}{8}$" diameter in a liquid within the vessel which is 6" high and submerge it 3" from the top, and both disks are revolved so that the peripheral speed of each disk is the same, the energy required to operate the large disk would be about one quarter that for operating the small disk, and the results obtained would be far superior. This action, although familiar as obtained by the action of heat on a liquid, could not be utilized in the treating of milk elements to obtain butter were it necessary to apply heat to the liquid sufficient to boil.

It is unnecessary to rotate the agitator at a very high speed, and for this reason the fly wheel 11 is very desirable as it imparts the desired steadiness to the operation, and materially assists the operator in turning the crank 4.

The manner in which the fly wheel 11 is attached to the vertical shaft 6 is shown in Fig. 4. 46 is the pin; 47, the upwardly projecting portion of pin 46; 48 is the hole in hub of fly wheel in which the upwardly projecting portion of pin 46 enters. 49 is the cross-wise slot in hub of fly wheel to receive pin 46. With this construction, the fly wheel can be readily removed by lifting it up. This method also keeps the fly wheel central and does not pull it out of center, as a set screw would.

In the example shown in Fig. 1 gears are employed in the driving mechanism and to insure quietness of operation in this example I prefer to make the gear 5 and its pinion 9 in the form of skew gears as indicated. The more quiet and easy running driving mechanism, however, is illustrated in Fig. 7 in connection with the single impeller. The solid shaft 6 has mounted upon it, above the bracket, in a position corresponding to the pinion 9 in the example of Fig. 1, a pulley 50 with two distinct grooves 51 and 52; while a driving wheel 53 with two distinct grooves 54 and 55 is rotatably mounted on the lower part of the arm 24' to rotate in a vertical plane. The outer end of the bracket 2' has, rotatably mounted upon it, an idler pulley 56 having two distinct grooves 57 and 58, and an idler pulley 59 having two distinct grooves 60 and 61. A belt 62 passes twice around each pulley 50 and 53, each turn of the belt passing around one of the distinct grooves in each pulley; and the idler pulleys 56 and 59 with their grooves carry the strands of belt as they pass from the wheel 53 to the wheel 50; these wheels 56 and 59 being properly inclined to receive the strands of belt in the positions they assume due to the difference between the diameters of the wheel 53 and the wheel 50. Such an arrangement secures the flexibility and lightness and smoothness of running of a relatively thin belt with the same strength as would be obtained with a thicker, stiffer belt and also secures a greater area of contact by the different strands of belt running in the distinct grooves than would be obtained with a single larger strand running in its groove.

The belt 62, of course, is made endless and of approximately the right length to secure just the right degree of tightness after the machine has been set up with the belt around the pulleys with the strands in the proper grooves. The driving wheel 53 is made adjustable downward by rotatably mounting it upon a collar which is clamped against the outer side of the arm 24' by means of a bolt, which passes through an upright slot in said arm.

The separate construction of the bracket 2' and the arm 24' as before alluded to, is shown in Fig. 7. The bracket 2 has extending outside the vessel 1, near its bearing on the rim thereof, a fork 64, and the arm 24' has on its upper end oppositely laterally extended lugs 65, which lie in recesses in the upper sides of the members of the fork 65 in the main part of the arm 24 between these members, so that by the interlocking engagement thus formed this upper part of the arm is effectively prevented from becoming detached from the bracket 2' after the lower end of the arm 24' has been brought under the table or other object and the clamping screw 27' therein brought up tight against the lower side of the object on which the apparatus is supported. At the same time when this clamping screw 27' has been loosened the arm 24' has been very quickly detached from the bracket 2' and by the detachment the removal of the belt 62 from the pulleys and the driving wheel is very readily accomplished. Also after the driving wheel 53 has once been adjusted to the proper position down on the arm 24', the apparatus may be set up and the belt, very readily applied by simply placing the belt in position in its grooves on its various pulleys and wheel and then swinging the arm 24' down on its pivot with the fork 64, will have the proper degree of tightness. Thus the only additional adjustment needed will be that due to possible stretching of the belt after continued use.

The above driving mechanism is disclosed and claimed in my co-pending application Serial No. 24,787, filed April 29, 1915.

In the example shown in Fig. 11 an electric motor 66 is shown mounted on the floor while the apparatus is mounted on a table or bench. This motor being provided with a small pulley 67 having two distinct grooves 68 and 69, while on the solid shaft 6 of the apparatus the fly wheel 11 is replaced by a large pulley 70 having two distinct grooves 71 and 72. The idler pulleys 56 and 59 are provided on the outer end of the frame 2, as in Fig. 7, and the belt 73 passes twice around each pulley 67 and 70 with its strands passing over the grooves in the pulleys 56 and 59, so that the motor 66 drives the apparatus with all the advantages due to the above described arrangement of the belt, while the pulley 70 owing to its large diameter acts as a fly wheel for the device. It will also be understood that the device with two impellers may be operated by a motor in the manner above described. This pulley 70, however, should be secured to the shaft 6 against upward displacement and the means for detaching the fly wheel 11 as shown in Fig. 4 and hereinbefore described is modified to the extent of adding a set screw 74 which extends through the hub of the pulley 70 against the upward extension 48 of the opening 46 holding the pulley down to this pin and at the same time this use of the set screw does not interfere with the centering of the pulley on the shaft as it would if it engaged directly with the shaft, because any displacement due to the set screw is manifested in the pin 46, which is slidable through the shaft.

For separating butter from either sweet or sour cream, the liquid is placed in the vessel to about the height of the heavy dotted line, with the impeller about midway of the depth of the liquid as shown. It is important that the depth of the liquid above the impeller disk be not too great; otherwise the entrance of the air under atmospheric pressure will be hindered. It is also important that the distance between the impeller and the bottom of the vessel be not too great, because any considerable quantity of liquid too far below the impeller will not be affected by the aeration and other forces acting upon it, and will not have the butter separated from it, but will merely serve as a collecting place for the butter separated from the upper liquid. On the other hand, it is highly desirable that the impeller disk be of considerable diameter in order to obtain the greatest amount of centrifugal action without impact and to operate on as large a quantity of liquid as is desired. For this reason the proper disposition of the body of liquid will be such that its width is considerably greater than its depth, as illustrated in the drawing and it is for this reason that the vessel is made wide and low so that it is possible for all the forces applied to the liquid to act upon it in a uniform manner. The milk elements should not have their temperature too low or too high, about 55 or 60 Fahrenheit being the preferred temperature. Such temperature is high enough to allow the operation to be performed quickly, and it is not so high as to cause the resulting butter to be too soft. With this method, butter may be produced in from three to ten minutes. Perceptible accumulation of butter will practically all take place during the last 15 or 60 seconds of the operation. The butter will form in granules, and then the residue may be drawn off from the vessel and the granules salted by agitation and aeration of brine with the granules in the vessel. When the salting operation is complete, the butter granules may be removed from the brine in the vessel, or the brine may be withdrawn from the butter granules, and the granules then removed from the vessel, after which the granules are worked or pressed into consistency for use. The efficiency of operation is such that fully 90% of the butter fat of the milk or cream is removed, and butter of purity of over 99% is obtainable, of firm texture and natural flavor.

Applicant believes that he is the first inventor to discover and make manifest to humanity the functions of minute currents of infinitesimal elements of harmonic forces on energy producing huge numbers of harmonic vibrations, operating upon a composite substance in a container with its diameter greater than its depth with a rotatable polygonal member with its diameter greater than its thickness, minimizing the vertical pressure and the impact, and maximizing the aeration and the centrifugal and the centripetal action, operating upon a body of a composite substance with its diameter greater than its depth.

I have shown and described a plurality of operations that produce a useful and novel result at a greater altitude of development.

What I claim and desire to secure by Letters Patent is:

1. In a device of the character described, in combination with a vessel, a bracket comprising a main part extending across the top of the vessel and forming supporting and bearing means for the operating mechanism of the device, means on one end of this main part bearing on the rim of the vessel, and another part extending down from said main part, outside and under the vessel, and clamping means on this part, under the vessel, whereby the bracket is held on the vessel and the vessel is held to suitable supporting means.

2. In a device of the character described, in combination with a vessel, a bracket comprising a main part extending across the top of the vessel and forming supporting and bearing means for the operating mechanism of the device, a part at one end of said main part having a downwardly opening channeled formation to fit over the rim of the vessel and support and steady the bracket, a securing element extending down from said main part, on the outside of the vessel, with an inwardly extended terminal part below the vessel, and clamping means on this terminal part whereby the bracket is held on the vessel and the vessel is held to a suitable supporting means.

3. In a device of the character described, in combination with a vessel, a bracket comprising a main part extending across the vessel and forming supporting and bearing means for the operating mechanism of the device, means on one end of this main part bearing on the rim of the vessel, and another part extending down from said main part, outside and under the vessel, clamping means on this part, under the vessel, whereby the bracket is held on the vessel and the vessel is held to suitable supporting means, a part at the other end of said main part to bear on the rim of the vessel, and means fixed on the rim of the vessel for this part to engage with, whereby this end of the bracket is supported and steadied.

4. In a device of the character described, in combination with a vessel, a bracket comprising a main part extending across the top of the vessel and forming supporting and bearing means for the operative mechanism of the device, a part at one end of said main part having a downwardly opening channeled formation to fit over the rim of the vessel and support and steady the bracket, an arm extending down from said main part, on the outside of the vessel, with an inwardly extended terminal part below the vessel, clamping means on this terminal part whereby the bracket is held on the vessel and the vessel is held to suitable supporting means, a part at the other end of said main part to bear on the rim of the vessel, and means fixed on the rim of the vessel for this part to engage with, whereby this end of the bracket is supported and steadied.

5. In a device of the character described, in combination with a vessel and bracket comprising a main part extending across the top of the vessel and forming supporting and bearing means for the operating mechanism of the device, means on one end of this main part bearing on the rim of the vessel and an arm detachably engaging with said bracket, adjacent to the part of the bracket that bears on the arm of the vessel, said arm extending down outside and under the vessel, and clamping means on the part of the arm under the vessel, whereby the bracket is held on the vessel and the vessel is held to a suitable supporting means.

6. In a device of the character described, in combination with a vessel and bracket comprising a main part extending across the top of the vessel and forming a supporting and bearing means for the operating mechanism of the device, means on one end of this main part bearing on the rim of the vessel, a fork on said bracket adjacent to the part of the bracket that bears on the rim of the vessel and extending outward from the vessel, an arm adapted to come between the members of said fork, oppositely extending lugs on said arm to lie over the members of said fork whereby the arm and fork make interlocking engagement, said arm comprising another part extending down outside and under the vessel, and clamping means on this part under the vessel whereby the bracket is held on the vessel and the vessel is held to suitable supporting means.

7. In a device of the character described, in combination with a supporting shaft and an impeller, a wheel mounted on said shaft with a bore through which the shaft extends, and a pin passing transversely through the shaft and having a part extending substantially parallel with the shaft, said wheel having a recess receiving this part, whereby the pin is held in the shaft by the wheel, and the wheel and shaft are caused to rotate together by engagement of said part of the pin in said recess in the wheel.

8. In a device of the character described, in combination with a supporting shaft and an impeller, a wheel mounted on said shaft with a bore through which the shaft extends, and a pin passing transversely through the shaft and having a part extending substantially parallel with the shaft, said wheel having a recess receiving this part, whereby the pin is held in the shaft by the wheel, and the wheel and shaft are caused to rotate together by engagement of said part of the pin in said recess in the wheel, said wheel having grooves at opposite sides of the shaft which receive the transversely extending parts of the pin, whereby these parts engage the wheel to reinforce the part that extends into the recess.

9. In a device of the character described, in combination with a supporting shaft and an impeller, a wheel mounted in said shaft with a bore through which the shaft extends, and a pin passing transversely through the shaft and having a part extending substantially parallel with the shaft, said wheel having a recess receiving the part, whereby the pin is held in the shaft by the wheel, and the wheel and shaft are caused to rotate together by engagement of said part of the pin in said recess in the wheel, and clamping means on said wheel and engaging with said part of said pin in said recess to hold said wheel and pin and shaft together against displacement of the wheel along the shaft away from said pin.

10. In a device of the character described, in combination with a vessel, a bracket comprising a main part extending across the top of the vessel and forming supporting and bearing means for the operative mechanism of the device, a part at one end of said main part having a downwardly opening channeled formation to fit over the rim of the vessel and support and steady the bracket, an arm extending down from said main part, on the outside of the vessel, with an inwardly extended terminal part below the vessel, clamping means on this terminal part whereby the bracket is held on the vessel and the vessel is held to a suitable supporting means, a substantially straight shank at the other end of said main part, and a cleat fixed to the top of the rim of the vessel, said shank engaging under said cleat between it and the top of the rim, whereby this end of the bracket is supported and steadied.

11. In a device of the character described, in combination with a supporting shaft, an impeller, means for holding said impeller upwardly on said shaft, a tubular shaft for said impeller detachably engaging therewith and having an open upper end and means for holding the impeller and its tubular shaft down upon the supporting shaft.

12. In a device of the character described, in combination with a supporting shaft and an impeller, means for holding said impeller upwardly on said shaft, a tubular shaft for said impeller having an open upper end, and means for holding said impeller and its tubular shaft down upon the supporting shaft, comprising a part detachably engaging the upper part of the tubular shaft, and means for clamping this part to the supporting shaft.

13. In a device of the character described, in combination with a supporting shaft and an impeller, a tubular shaft for said impeller having an open upper end, and means for supporting said impeller and its tubular shaft with respect to the supporting shaft, comprising a hub embracing the supporting shaft, means on the hub to clamp it to said supporting shaft, and arms on said hub detachably engaging the upper part of the tubular shaft.

14. In a device of the character described, in combination with a supporting shaft and an impeller, a tubular shaft for said impeller having an open upper end, and means for supporting said impeller and its tubular shaft with respect to the supporting shaft, said tubular shaft having a ferrule with its upper edge turned in over the upper edge of the tubular shaft, said turned-in edge having inwardly opening recesses exposing parts of the edges of the tubular shaft, and said supporting means comprising arms having terminal parts detachably engaging in said recesses and upon the exposed parts of the tubular shaft.

15. In a device of the character described, in combination with a supporting shaft and an impeller, a tubular shaft for said impeller having an open upper end, and means for supporting said impeller and its tubular shaft with respect to the supporting shaft, said tubular shaft comprising a rectangular plate bent into cylindrical form with its ends abutting in a seam, said impeller having an opening in it, the lower end of said tubular shaft being secured to said impeller adjacent to the opening, a ferrule on the upper end of said tubular shaft acting to maintain the cylindrical form of the tubular shaft and having its upper edge turned in over the upper edge of the tubular shaft with inwardly opening recesses in the turned in edge exposing parts of the edges of the tubular shaft, said supporting means comprising arms having terminal parts detachably engaging in said recesses and upon said exposed parts of the edges of the tubular shaft.

16. In a device of the character described, in combination with a supporting shaft and an impeller, said impeller having an opening through which said supporting shaft extends, said supporting shaft having an opening transversely through it below the lower side of the impeller, a pin with its diameter substantially the size of the opening extending through the opening in the shaft and engaging with the lower side of the impeller, an upwardly extending lug on said pin, said impeller having another opening in it, within which said lug engages, whereby the pin holds the impeller up on the shaft, and the impeller holds said pin in the shaft.

17. In a device of the character described, in combination with a supporting shaft and an impeller, said impeller having an opening through which said supporting shaft extends, said supporting shaft having an opening transversely through it below the lower side of the impeller, a pin with its diameter substantially the size of the opening extending through the opening in the shaft and engaging with the lower side of the impeller, an upwardly extending lug on said pin, said impeller having another opening in it, within which said lug engages, whereby the pin holds the impeller up on the shaft and the impeller holds said pin in the shaft, and means for holding said impeller down against said pin.

18. In a device of the character described, in combination with a supporting shaft and an impeller comprising an upper member and a lower member, a tubular shaft for said upper impeller member having an upper end, said lower impeller member having an opening through which the terminal part of said supporting shaft extends, and said supporting shaft having an opening transversely through it below the lower side of the lower impeller member, a pin passing through the opening in the shaft, an upwardly extending lug on said pin, said lower impeller member having an opening in which the lug is received, whereby the pin supports the lower impeller member, and whereby the lower impeller member holds the pin in position for supporting it, and means to hold said upper impeller member down toward the lower member and cause it to rotate with the supporting shaft, this means detachably engaging with the upper end of the tubular shaft.

19. In a device of the character described, in combination with a supporting shaft and an impeller comprising an upper member and a lower member, a tubular shaft for said upper impeller member having an open upper end, said lower impeller member having an opening through which the terminal part of said supporting shaft extends, and said supporting shaft having an opening transversely through it below the lower side of the lower impeller member, a pin passing through the opening in the shaft, an upwardly extending lug on said pin, said lower impeller member having an opening in which the lug is received, whereby the pin supports the lower impeller member, and whereby the lower impeller member holds the pin in position for supporting it, means to hold said upper impeller member down toward the lower impeller member and cause it to rotate with the supporting shaft, this means detachably engaging with the upper end of the tubular shaft, each impeller member comprising resilient sides engaging with the resilient sides of the other, whereby the impeller members are held to rotate together, and whereby the upper member engages to bear down upon the lower impeller member at various adjustments up or down the supporting shaft, said means detachably engaging with the upper end of the tubular shaft comprising clamping means to clamp it to said supporting shaft in various positions therealong.

20. In a device of the character described, in combination with a vessel and a brake to be held upright therein adjacent to the inner wall thereof, a bracket extending across the top of the vessel and forming supporting and bearing means for operative mechanism of the device and having a downwardly opening socket, the upper end of said brake fitting in said socket with its upper end bearing tightly against the upper end of the socket, and the lower end of the brake bearing tightly against the bottom of the vessel, whereby said bracket holds said brake in position in the vessel.

21. In a device of the character described, in combination with a vessel and a brake to be held upright therein adjacent to the inner wall thereof, a bracket extending across the top of the vessel and forming supporting and bearing means for operative mechanism of the device and having a downwardly opening socket, the upper end of said brake fitting snugly in said socket, and the lower end of the brake bearing tightly against the bottom of the vessel, whereby said bracket holds said brake in position in the vessel, said upper end of said brake being inclined both ways from its middle, and said socket in said bracket being correspondingly shaped, whereby the upper end of said brake bears tightly against the upper end of said socket, for the purposes set forth.

22. In a device of the character described, in combination with a vessel, and a bracket extending across the top of the vessel and forming supporting and bearing means for the operative mechanism of the device and a shaft comprised in said operative mechanism and extending down from the bracket, a lid for said vessel comprising two separable sections having overlapping means across the middle of the vessel under the bracket terminating at each side of the lid in notches, whereby, when the sections fit together, recesses are formed to fit around the bracket where it bears on the vessel at each side, and having coinciding notches at the middle at the overlapping parts, whereby an opening is formed to fit around said shaft.

ALPHEUS FAY.

Witnesses:
H. D. JOHNSON,
CARL E. JOHNSON.

Copies of this patent may be obtained for five cents each, by addressing the "Commissioner of Patents, Washington, D. C."